UNITED STATES PATENT OFFICE.

BENJAMIN S. PASCHALL, OF SEATTLE, WASHINGTON.

SUBSTANCE FOR TREATMENT OF TUBERCULOSIS, LEPROSY, AND OTHER DISEASES AND PROCESS OF MIXING SAID SUBSTANCE.

1,250,345.  Specification of Letters Patent.  Patented Dec. 18, 1917.

No Drawing.  Application filed May 1, 1917.  Serial No. 165,710.

*To all whom it may concern:*

Be it known that I, BENJAMIN S. PASCHALL, a citizen of the United States, and a resident of Seattle, State of Washington, have invented certain new and useful Improvements in Substances for Treatment of Tuberculosis, Leprosy, and other Diseases and Processes of Making Said Substances, of which the following is a specification.

This invention relates to a new method of treating and raising the immunity against tuberculosis, leprosy and other diseases, based upon hitherto unknown bio-chemical phenomena, and by means of a new substance produced by a new process. As a part of the process for producing the new substance, my invention also relates to new culture media for growing the bacilli, which media is produced by a new process.

It has already been stated in my copending application, Serial No. 784,706, that antibodies—enzyms of a specific nature—are produced by animals and man following the introduction, artificially or otherwise, of certain substances of more or less, usually high, molecular complexity. The specific enzyms are capable of combining with the substance introduced in such a manner as to bring about its alteration for purposes of assimilation or destruction, as the case may be.

In the present state of our knowledge, the relationship between the defense mechanism of living protoplasm and its metabolic functions lies in exceedingly close parallelism, the main difference seeming to be one of specificity, though it is well recognized that the functions are so similar that the terms enteric and parenteric enzyms are of constant application. My researches and discoveries have to do with a new principle of a basic nature, the significance of which has never been brought out by any previous investigator, which may be described as the relation between chemical constitution and specific physiologic action (immunity).

In the researches of others into the relationship between the chemical composition and pharmacological action, in which no immunity, as we understand it, takes place, it has been repeatedly demonstrated that in both the aliphatic and carbocyclic series of compounds the physiological action may be profoundly altered by the addition to or substitution of, in the first series, the hydrocarbon chain with alkyl, hydroxyl, carbonyl, carboxyl, sulfonal or amino groups, the halogens, etc., while in the second series the latent action of the nucleus is profoundly altered by both the presence and the position of these and an infinite number of other groups existing as side chains or in chemical combination.

As a result of my researches and experiments, I may state that in general while the introduction of certain of these groups into the molecule of certain drugs and other compounds, of like nature and more or less simple structure, often renders them useless, inert and of wholly different physiological action, the same does not necessarily follow in the more complex molecules about to be described, as far as antibody formation is concerned, indeed I have discovered the reverse to be frequently the case. For instance, from a pharmacological standpoint, the entrance of carboxyl into methylamin changes the latter into a harmless glycin. Sulfonation of many bodies, as for example—morphin, renders them inert. Active aldehydes become inactive aldols by the introduction of the hydroxyl group and poisonous alcohols become harmless glycerols and mannitols by the same process. Furthermore, the selective action of a drug depends upon both the definite structure of the parent molecule as well as this specific affinity of its side chains for certain groups of cells in the body. The selective action of cocaine for nerve-endings is well known, and masking the carboxyl group of benzoyl ecgonin brings this about. Trional, sulfonal and other compounds of this series are mercaptan derivatives containing the alcohol group as a side chain, the sleep-producing effect of the drug being due to the fact that the alcohol cannot be oxidized by any body-cell, but is only liberated in the sleep centers of the brain. Now, approximately the same quantity of alcohol attached to another molecule, a xanthin molecule, for example (caffein) becomes a powerful heart stimulant and diuretic.

The action of a pharmaceutical compound depends partly upon its individual chemical composition, partly upon the composition and position of the side chain and partly on the group of cells attacked in the organism complex. This might be better illustrated in the case of salvarsan. In this instance, Ehrlich discovered the affinity between certain benzene derivatives and certain of the protozoa. But the derivative itself was not capable of killing the trypanosome and in order to effect a destructive action upon the protozoa, arsenic was entered into the molecule, which poisonous substance becomes liberated at the moment the side chain portion of the derivative attaches itself to the organism in question, causing its destruction, without combining with the body cells of the host and exerting its poisonous action upon them. These are fundamental principles underlying the relationship which exists between chemical composition and pharmacological action. In my researches, experiments and discoveries, I have utilized the foregoing principles for the production of pharmacological action and chemotherapeutic properties and have combined them with the principles ordinarily understood to govern the production of immunity in the following way. Much of the synthetic chemistry of the cyclic compounds is simply an elaboration or modification of the benzol nucleus $C_6H_6$, from which hydrocarbon, countless new substances have been built up in the laboratory. In a like manner I have built up many new synthetic substances using instead of benzol the various unsaturated hydrocarbons elaborated by the tubercle bacillus, and in like manner have added appropriate side chains or combining groups by identical processes, so that the hydrocarbons thus acted upon may be so modified as to be taken up by the body cells when properly introduced, whereupon immunity for all the original hydrocarbons from which the derivatives come will take place when all its ingredients are present, provided these changes have been brought about without disturbing or altering in any way the basic configuration of the original molecules (isomerism, polymerization, etc.)

In my copending application, Serial No. 784,706, I stated that a considerable degree of immunity could be produced by the introduction into the blood of the ethyl esters of the fatty acids obtained from the wax of the tubercle bacillus. My subsequent researches have developed the fact that this immunity can be very greatly enhanced by the production of suitable combinations, (artificial addition of side chains), with the various other portions of the wax. These derivatives consist of unsaturated hydrocarbons and alcohols in addition to the fatty acids originally described. In passing, it may be said that the origin of these hydrocarbons is somewhat in doubt, it being well known that some unsaturated alcohols readily pass into olefins on heating in presence of alkalis, etc., though the original wax is insoluble in acetic anhydrid, and while on account of their natural reactivity they already have a slight natural immunizing value, their activities are very considerably enhanced by condensation or combination with other suitable substances, as for example, with certain aldehydes, ketones and organic acids of either the aliphatic or cyclic series. It is probable that these hydrocarbons either exist free, as is the case in certain other waxes, in oil of roses, in the terpenes and in various other places in nature, or that they exist in chemical combination with fatty acids present in the tubercle bacillus wax and are split free during the process of saponification, the latter view being the most likely, since upon saponification of a synthetically formed ester, I usually recover the hydrocarbon. It seems, however, that the various naturally occurring wax esters, i. e., the hydrocarbons and alcohols, especially the former, in their original combination with the fatty acids are exceedingly hard to split by the body unless modified as I will describe. The higher alcohols which may be esterified to form suitable esters as the acetates, lactates, benzoates, salicylates, etc., are far less reactive before this treatment, even though they possess an active OH group, and absorption in the tissues is manifestly much slower and in some cases fails to take place at all.

I have observed that the saponification process alone is by far the most important single step in effecting a separation of the various molecular complexes of the wax, since after saponification, any of these substances, hydrocarbons, alcohols, or fatty acids, or all of them are more readily taken up by the tissues than before hydrolysis had taken place, whereas, if the saponification is incomplete, failure on the part of the tissues to combine and take up the wax is immediately evident. The esterification or condensation of hydrocarbons, alcohols and fatty acids in some suitable manner is also a very necessary step of the process, in that it protects these molecules from further chemical changes, (oxidation, re-combination, reduction, and especially polymerization). Condensation of the hydrocarbons with suitable substances or direct esterification, halogenation or oxidation and subsequent esterification, or substitution of the derivative, etc., render it more stable and enormously enhance its capacity for combining with suitable body cells (receptors).

Now, while in theory the injection of the wax of the tubercle bacillus into the animal body would produce specific antibodies it has been proved by my researches, and by those of others, that such a phenomenon does not take place, on account of the extreme stability of the parent molecule. When, however, this molecule is split into its various parts and each of these parts combined with other suitable chemical substances or transformed into more suitable chemical bodies, i. e., hydrocarbons into alcohols, alcohols into aldehydes and aldehydes into fatty acids with their condensation or esterification products, which act as intermediaries between various wax derivatives and the body cells, and these parts are remixed in the same proportion as they existed in the parent substance in the simple physical mixture, but so altered or modified as to be suitable for injection, it will then be found, as has been proved by my researches and discoveries that the body cells will produce antibodies (enzyms) for all the different esters, condensation products or other suitable transformation complexes, which anti-bodies are specific in turn for the parent substance, that is the original tubercle bacillus wax, and after reaching a sufficient degree of concentration in the blood and tissues these anti-bodies or enzyms will attack and break up the hitherto unattacked parent substance, that is the wax surrounding the living tubercle bacillus whereby disorganization, together with the destruction of the micro-organism and the disappearance of the disease ensues in consequence. Previous to my researches and discoveries no investigator has sought to attach actual chemical side chains to the various antigens by following out the principles which are applied in the production of synthetic drugs and other chemotherapeutic substances, in order that the antigen itself may be supplied with suitable side chains exactly as pharmacophore groups are attached to bring about a specific action of the synthetic drug in question. Nor, has anyone demonstrated or even suggested the possibility that antigens (chemical substances produced by invading micro-organisms) could be so treated in order to bring about immunity. These researches and discoveries therefore embody a basic principle not hitherto known to exist.

It should be understood that the words "side chain" as used by the chemist to denote very definite chemical formulæ of known molecular composition are used by the immunologist as purely diagrammatic imaginary bodies of unknown chemical composition and little understood action, a term borrowed from the organic chemist by the biologist to serve as a working hypothesis until something more definite could be found out about the ultimate composition of these combining groups possessed in common by body cells and bacteria.

Previous to my investigations and discoveries, the production of tubercle bacillus wax rapidly and in large quantities and at a very moderate cost was unknown. The market cost of a pound of the dried tubercle bacillus from which a third to a half of a pound of the wax can be obtained, ranges from seven hundred and fifty ($750.00) dollars to one thousand ($1,000) dollars. My incubator, which serves as a model, has a capacity about 220 cubic feet, and produces on an average of five pounds of dried tubercle bacilli per month. In order to do this, I first discovered that certain attenuated fast growing tubercle bacilli or other acid fast organisms belonging to the same group produce waxes of approximately the same chemical composition as is produced by a highly virulent and very slow growing tubercle bacillus. The classical culture media used by others for growing the tubercle baccilli and other acid fast organisms belonging to this series, (*Mycobacteriaceæ*) consist of extract of beef, peptone, glycerin and salts, and one gallon of this media grown with virulent tubercle bacilli yields from one to three grams of dried organisms in from three to six months, at a cost of approximately one dollar per gallon for culture media used, while with my new media to be described, I obtain a yield of from five to ten grams dried tubercle bacilli in from three to six weeks at a cost of approximately one cent a gallon or less. It will thus readily be seen that the cost of production by methods used by others will render it well nigh prohibitive. This cheap culture media therefore, I consider one of the most important discoveries in the process and while other inexpensive culture media have been used successfully by myself, the ones I am about to describe are the ones I prefer. These organisms demand for their growth chiefly, four kinds of chemical substances, salts, extractives, proteids and a suitable source of carbon (carbohydrates or hydrocarbons) for wax-building. I obtain my extractives and part of my proteids from brewers' or distillers' yeast, chemical analysis having shown a close identity between the extractives from yeast and beef. For my proteids I use dried skim milk or other cheap proteids which are not denaturalized (rendered unsuitable for the growth of micro-organisms) by the action of chemicals, (acids or alkalis which are used in lieu of the expensive digestive ferments for the production of hydrolysis) (peptones). I treat dried skim milk with such an amount of caustic potash or soda that it becomes soluble in water so as to produce a neutral solution after heating, (not a colloidal suspension). As a source of carbon for wax building, I use glucose which must not be added to the milk soda solution until after it becomes neutral, i. e., until chemical combination has become complete. Brewers' yeast is treated with approximately 7½% KOH or NaOH and boiled for several days before hydrolysis is complete. A calculated quantity of this solution is then added to the milk powder, so that the end reaction is neutral or slightly acid. In case of distillery waste, a mineral acid preferably hydrochloric is used unless the sugar content is so low as not to injure the culture media by the use of alkalis and later neutralized and the milk treated with alkali separately. To this glucose in proper proportion, 1% to 5% may be added, together with one-half of one per cent. of NaCl or other suitable salt, the final culture media containing approximately 10% or less of solid matter. This substitution of cheap sources of extractives carbohydrates and proteids which I have discovered has been used successfully to greatly increase the quantity of organisms grown without disturbing in any way the chemical composition of the wax elaborated by the bacillus. As a matter of fact, my researches have proved time and again that the addition of glycerin has a tendency to increase the production of fatty acid glycerids at the expense of more valuable higher alcohols and hydrocarbons. I also claim as a new discovery the use of rapidly growing tubercle bacilli as well as of the other acid-fast organisms as timothy bacilli, butter bacilli, grass bacilli, etc., and have proved by analysis that the wax elaborated by them is identical with that produced by virulent tubercle bacilli. It is also important for my process that the culture media be frequently shaken during the growth of the organism, at least once a week or once in ten days, the chemical composition of the wax being profoundly affected by this procedure. The well-known fact that attenuated tubercle bacilli or other acid-fast organisms do not produce the same toxins (tuberculins) which are produced by virulent organisms, does not follow out when it comes to the production of waxes, as I have proved by chemical analyses and by experiments on animals. The suitable proportions of the various wax ingredients as has been shown by the analysis of the virulent tubercle bacilli, are approximately hydrocarbon derivatives two parts, higher alcohol esters one part and esters of fatty acids three parts. I also consider as important the selection of certain strains of organisms which produce the suitable waxes in suitable proportions and which in addition produce dry clumping growths on cheap culture media and not easily broken up in the process of separating them from the culture media upon which they grow, and thus entailing great loss of bacillary substance on straining and subsequent washing. After complete growth is obtained, the organisms are removed from the culture media in some suitable manner, as through a fine-meshed sieve, washed with water, dried at a temperature which should not exceed 80° C. preferably in the absence of oxygen and not in contact with metallic substances, as in a vacuum drier, it being of the utmost importance to avoid oxidization or polymerization products in every way possible, always keeping in mind that these substances are practically unsaturated compounds. The organisms are cooled and ground in a suitable grinding machine. They are then placed in an alcoholic potash solution containing an excess of chemically pure potassium hydroxid in 96% alcohol. Equal parts of benzol may be added and the whole subject to saponification under a reflux condenser. In this the saponifying medium should be kept about 80° centigrade, free from air and should be supplied with a mechanical stirrer and saponified from twelve to twenty-four hours. I consider it important that the temperature of the saponifying media does not exceed 80° centigrade. After saponification, which is complete in about twelve to twenty-four hours, the supernatant fluid is decanted and the residue is washed in alcohol and benzol and the washings added to the decanted liquid. Equal parts of water are now added, and if necessary, the caustic potash nearly neutralized with a dilute acid or $CO_2$ gas. This solution which should be kept moderately cool, not exceeding 80° C., is shaken with hot benzol in a suitable container. With this treatment the benzol containing the hydro-carbons and alcohols will separate into a supernatant layer with the soluble soaps beneath. The soap solution is washed twice more with benzol and the benzol fractions united. Benzol fractions are partly concentrated by distillation *in vacuo* and washed with water containing alcohol and this is continued back and forth until the benzol is free from soaps and contains only hydrocarbons and alcohols and the wash-water contains only soaps. During this process the absence of air is desirable but not imperative. The dilute alcoholic alkali solution now contains substantially all the potassium salts of the fatty acids present in the tubercle bacilli ranging from about 25% to about 45% of the total substance by weight originally treated. The whole is then treated with dilute acid, as hydrochloric or sulfuric acid, whereby the insoluble fatty acids are precipitated. These insoluble fatty acids are collected on a filter, washed, dried and dissolved in five to ten times their quantity of ethyl alcohol, filtered and esterified by the addition of an excess of sulfuric acid or by passing anhydrous hydrochloric acid gas through the mixture for about an hour. The resulting esters are now washed in hot water until free from acid and are ready for use. The ethyl esters derived from the tubercle bacillus wax are a dark brown oil or fat-like substance, solid at room temperature, possessing a fruit-like fragrant ordor and resinous, slightly burning taste, liquefying at from about 25° to about 35° C., the resulting liquid being of a clear dark color, insoluble in water and possessing a neutral reaction. It is soluble in ether, chloroform and petroleum ether, insoluble in glycerin and sparingly soluble in alcohol. Aqueous mineral acids and alkalis decompose it into its fatty acids and its identification may be determined by hydrolysis and subsequent determination of these. Treatment with concentrated ammonia yields the amids. These esters distil between about 250° C. and about 350° C. with more or less decomposition. The specific gravity of the esters is about .86 to .89. The benzol portion is now distilled preferably in vacuum, until the benzol is mostly removed. Dilute glacial acetic acid or preferably hydrochloric acid which removes traces of proteid is now added in considerable quantity until the mixture is weakly acid, drawn off from the benzol and the distillation continued *in vacuo* until no more benzol comes off. The alcohols and hydrocarbons are now dried, treated with equal parts of acetic anhydrid and boiled under a reflux condenser for two hours. The mixture is then placed in a separatory funnel, cooled to about 37° C., and the acetates of higher alcohols drawn off. A second treatment using a little more acetic anhydrid will increase the yield of alcohol esters considerably. The acetic anhydrid is now hydrolized in hot water and the alcohol acetates which rise to the top of this solution are collected and washed free from adherent acetic acid, dried and purified. These esters are quite dark in color, due to coloring matter which may be removed by dissolving them in petroleum ether and passing chlorin through the mixture very cautiously, when the coloring matter will precipitate out in a gummy mass. The excess of chlorin and the chlorin in the addition products may be removed by shaking the petroleum ether in hot water containing potassium or silver acetate several hours. The petroleum ether is then evaporated at a low temperature in a vacuum and the now purified acetic esters of the higher alcohols recovered, although the method of bleaching which I prefer when practical is by direct sunlight on the alcohol acetates, they being exposed several days in thin layers and subsequently filtered. The hydrocarbons are now purified by boiling in acetone (about five times the quantity) and decanting the latter at about 37° C., and repeating this until the acetates of the remaining higher alcohols have been removed, as may be shown by their solubility in warm acetic anhydrid. The now purified hydrocarbons may be treated in one of several ways. They may be placed in an excess of carbon tetrachlorid and bromin cautiously added at room temperature until decolorization no longer takes place after standing several hours. An excess of silver acetate is then added and heat applied, whereupon the acetates of the alcohol derivatives of the hydrocarbons may be obtained. Or, the hydrocarbon may be oxidized in dilute potassium permanganate sulfuric acid solution and the oxidation products (alcohols) subsequently esterified. They may be oxidized by heating with dilute nitric acid and by treating with acetic acid in the presence of dilute sulfuric acid, but the method which I prefer is as follows:—The hydrocarbons are dissolved in five times the quantity of chloroform or carbon tetrachlorid and heated with equimolecular proportions of sodium salicylate and about one-third molecular proportion of phosphorous penta-chlorid, and the whole heated at a low temperature for twenty-four hours and the $CCl_4$ distilled off, or the $CCl_4$ may be omitted and the mixture directly heated to 130° C. for thirty minutes. The salicylates are then poured off from the residue purified by washing with dilute alkali until neutral, dried at low temperature and are ready for use. The melting point of the mixed hydrocarbons is from 55 to 60° C., and the melting point of the salicylates is 38° to 40°. The salicylic esters of the hydrocarbons are now mixed with acetic esters of higher alcohols in about the proportion of two to one, and these in turn are mixed with an equal proportion of the ethyl esters of the fatty acids, described as above or in Serial No. 784,706. I have also used with equal success in treating tuberculosis the salicylic esters of both alcohols and hydrocarbons made by the identical steps described for the hydrocarbons alone. Previous to my researches, however, no one has succeeded in combining unsaturated hydrocarbons direct with fatty acids by the use of $PCl_5$, although the method has been used frequently in the case of alcohols of both series. Indeed, so rare are higher unsaturated hydrocarbons of this aliphatic series, that almost nothing is known about their behavior, either chemically or biologically.

The substances most closely related belong to the terpenes, the essential oils and a few unsaturated compounds of this class obtained in the laboratory synthetically. In all my experimental work, therefore, I have had little or nothing on which to base my observations from those which had been made previously by others upon very similar compounds.

I consider it important for my process that these hydrocarbons be furnished with just as many OH groups as is practicable and these in turn united to as many appropriate side chains as is possible, always bearing in mind that while the addition of each OH group increases the ease of absorption and assimilation by the tissues and cells of the body, it also increases the difficulty of hypodermic administration, it being found that the oil-like characteristics of the substance decrease and the sugar-like properties increase (increase of solubility in the body fluids) in just the proportion that the OH groups are contained in the molecule. In other words, I have observed all the transitional stages between hydrocarbons and carbohydrates with these highly reactive bodies in the laboratory and the ease or difficulty of injection is an important criteria.

The substances thus produced, resemble, more than anything else, the wax of the tubercle bacillus, although the melting point is somewhat lower and the mixture possesses a quite definite, somewhat fragrant odor. Its color depends upon the degree of purification, certain methods of bleaching, and the care with which the oxygen and other impurities have been excluded at certain periods of its production. As a means of identification, in addition to the characteristics about to be described, it is claimed that this substance possesses specific characteristics; i. e., it conforms with the laws commonly understood by biologists and generally recognized by workers in the field of immunity. For example, human red blood corpuscles will produce, in an experimental animal, specific ferments capable of dissolving human red blood corpuscles and not capable of dissolving red blood corpuscles of an other species of animal, except those closely related to or identical with the human species. That is, the serum of a guinea pig or rabbit thus treated will, after an interval digest human blood corpuscles, but not those of an ox, dog, sheep, goat, or pig.

Furthermore, in the standardization of diphtheria antitoxin, the test animals are first injected with lethal doses of diphtheria toxin, or many times the lethal dose, together with the antitoxin. Since the chemical nature of antitoxin is unknown, its chief means of identification, potency and specificity depends on this single characteristic, namely, that it and no other known substance will prevent the death of the animal receiving lethal doses of diphtheria toxin. Furthermore, no other antitoxin, like tetanus antitoxin has the slightest effect in neutralizing diphtheria toxin.

In the practical manufacture of this substance for the treatment of tuberculosis in man, a portion of each manufactured lot or batch produced is set aside and used on a guinea pig artificially inoculated with virulent fatal doses of tubercle bacilli. If the substance herein described fails to act and the animal dies of the disease, the whole output or batch is discarded and not used for human treatment. The similarity between this method and that of standardizing diphtheria antitoxin becomes at once evident.

So far as known, no other substance so far discovered will eradicate tuberculosis in a susceptible animal inoculated with virulent organisms in sufficient amounts to destroy life in approximately ninety days, as I claim takes place with this substance. Any other substance which produces this result should, according to our present conception of immunity, be identical in chemical structure to the one herein described. Also, characteristics for identification may be found in the original wax from which it is derived, this laborious process of growing these organisms and extracting the waxes therefrom being the only known method of obtaining this particular parent substance. For example, a guinea-pig inoculated with 5/100 milligrams of virulent tubercle bacilli will die in from 6 to 12 weeks in a vast majority of cases, whereas a similar animal inoculated with the same dose and treated with proper doses at suitable intervals with the derived substances herein described will completely recover from the disease in the vast majority of cases. Furthermore, the processes herein described for the production of substances easily absorbed by the tissues are in many instances the identical processes used by chemists for purposes of identification of the various fats and waxes.

Analysis of the original wax develops the presence of two unsaturated hydrocarbons, two unsaturated alcohols, and four unsaturated fatty acids. The hydrocarbons have a bromin absorption value which will indicate a molecular weight corresponding to approximately $C_{29}H_{56}$ (404) and $C_{27}H_{52}$ (376). the melting point of one hydrocarbon is 65° C. and the other one 55° C. They and their alcohol derivatives are insoluble in twice the quantity of boiling acetic anhydrid, a distinction from all other known higher alcohols. Conversion of the hydrocarbons into alcohols slightly increases their solubility in acetic anhydrid, but does not render them wholly soluble, even in large quantities of boiling acetic anhydrid. They are insoluble in even five times the quantity of acetone at 37° C., the naturally occurring alcohols, or their esters, being almost wholly held in solution at this temperature. They may be converted into alcohols by many of the known methods of oxidation, although a great number of the commonly employed methods (sulfonation, halogenation, etc.,) yield resinous polymerization products or carbohydrates. The salicylates of the mixed hydrocarbons as I use them, are clear, light-colored, somewhat viscous substances, having a melting point of about 38° C. Saponification of the salicylates recovers salicylic acid in such quantity as to prove equimolecular combination, and the hydrocarbons are recovered from the saponification mixture. This fact alone strongly indicates the presence of the hydrocarbons in the original wax. No investigator has hitherto effected a direct esterification of unsaturated hydrocarbons by the method I have described. The classical method of Bertram causes unsatisfactory polymerization products. By the action of strong alkalis these hydrocarbons form addition products which are in turn decomposed by water, whereby the melting point becomes raised 40° or 50° C., and on addition of dilute acid or water they are regenerated (acetylene group). They are capable of forming metallic salts under suitable conditions, indicating the presence of a triple bond. They are not capable of combining with acetic anhydrid, acetyl chlorid, benzoyl chlorid, etc., (further differentiating from alcohols). Upon oxidizing the hydrocarbons with dilute potassium permanganate in the presence of sulfuric acid and boiling with twice the quantity of acetic anhydrid, an acetate is formed with a melting point of 58° C. Tests for aldehydes have been negative, i. e., the compounds do not form compounds with saturated sodium bisulfite, do not react with phenlyhydrazin, or hydroxylamin hydrochlorid, do not color the fuchsin reagent, etc. The hydrocarbons are polymerized by many of the metallic salts, as $ZnCl_2$, $AlCl_3$, $Fe_2(Cl)_6$, etc., even in traces. (That is the reason why chemically pure reagents must be used in these processes as well as suitable containers.) Heating the hydrocarbons with fuchsin or fuchsin decolorized with acid gives a very dark purple color, (not decolorized by ethyl alcohol), while the alcohols or their acetates are dyed red, a matter of great biochemical importance, since the resting forms or spore forms of the tubercle bacilli, give the deep purple red color, while the activity growing organism stains red, from which it may be concluded that the most resistant forms of tubercle bacilli chiefly utilize the hydrocarbons for their protection. The specific gravity of the hydrocarbons is 0.84062.

The alcohol acetate derivatives of the hydrocarbons are produced by adding to 40 gr. of hydrocarbon in carbon tetrachlorid 9.564 gr. of bromin, and allowing the mixture to stand four hours at room temperature, then adding an excess of silver acetate and warming for twenty-four hours under a reflux condenser, filtering and evaporating the solvent. Saponification of these acetates shows equimolecular combination to have taken place. They, however, are only sparingly soluble in boiling acetate anhydrid, a peculiarity which would serve to differentiate them from other up to now described higher alcohols.

The two alcohols, or their acetates, are soluble in twice the quantity of acetic anhydrid or five times the quantity of acetone cooled to 37° C. They are very dark in color, due to impurities, (hydrocarbons being light in color), and readily polymerize in the presence of strong alkalis or acids, traces of metallic salts, and other impurities, etc., from which the original alcohols can not be regenerated. By fractional crystallization from acetone, these alcohols may resolve into two portions, one having a melting point 50° C., and one having a melting point 10° C. The melting point of the acetate of higher fraction is 45° C. Saponification of this fraction gives an acetyl value of 100.98 corresponding to molecular weight $C_{28}H_{56}O$ (408). The acetates of the fraction melting at 10° C. occur in very small quantities. They do not combine with metals and probably differ from the hydrocarbons in containing a double bond (olefins).

These alcohols are easily decolorized by passing chlorin through their solution in $CCl_4$ or petroleum ether and evaporating over silver or potassium acetate or by exposure to sunlight in thin layers. The melting point of all the various derivatives mixed together, is approximately 35° and contains in suitable proportions suitable esters or condensation products of the hydrocarbons, together with suitable esters or condensation products of the higher alcohols in addition to suitable proportions of the ethyl esters of the fatty acids described as above or in my previous application, Serial No. 784,706. This substance, as before mentioned, is most useful when its parts are mixed together in the proportion of esters of hydrocarbons, two; esters of alcohols, one; ethyl esters of fatty acids, three.

Analysis of the original wax in my laboratory gives:

Iodin value _____ 20
Saponification value _____ 130
Unsaponifiable substance__ 33⅓%

*Average yields.*

The average yield from 1000 grams of wax is approximately:

Alcohols _____ 50 gms.
Hydrocarbons _____ 100 gms.
Fatty acids _____ 300 gms.

Total _____ 450 gms.

From the finished product, the three groups of substances, alcohols, hydrocarbons and fatty acids can be recovered in quantitative proportions by the same methods of saponification and purification which were used in the case of the original wax, as herein described. As these substances are derived from bacteria of the various species of the genus *Mycobacteriaceæ*, I have designated the alcohols as mycol alcohols, the hydrocarbons as mycolenes, and the fatty acids as mycoleic acids.

These derivatives obtained from the wax of the acid-fast bacteria, when injected separately or mixed together into the host, attack the wax elaborated by the bacilli therein so as to dissolve or digest or catabolize or destructively change the same.

I claim and desire to obtain by Letters Patent the following:

1. A substance comprising a derivative of a compound contained in the wax elaborated by acid-fast bacilli containing only organic radicals having therapeutic action upon the host containing the acid-fast bacilli when administered parenterically.

2. A substance comprising a derivative of a compound contained in the wax elaborated by tubercle bacilli containing only organic radicals having therapeutic action upon the host containing acid-fast bacilli when administered parenterically.

3. A substance comprising a derivative of a compound contained in the wax elaborated by acid-fast bacilli containing only organic radicals capable of hypodermic injection without caseation.

4. A substance comprising a derivative of a compound contained in the wax elaborated by tubercle bacilli containing only organic radicals capable of hypodermic injection without caseation.

5. A substance comprising an ester derivative of a fatty acid contained in the wax elaborated by acid-fast bacilli having therapeutic action upon the host containing acid-fast bacilli when administered parenterically.

6. A substance comprising an ester derivative of a fatty acid contained in the wax elaborated by tubercle bacilli having therapeutic action upon the host containing acid-fast bacilli when administered parenterically.

7. A substance comprising an ethyl ester of a fatty acid contained in the wax elaborated by acid-fast bacilli having therapeutic action upon the host containing acid-fast bacilli when administered parenterically.

8. A substance comprising an ethyl ester of a fatty acid contained in the wax elaborated by tubercle bacilli having therapeutic action upon the host containing acid-fast bacilli when administered parenterically.

9. A substance comprising an ester derivative of an alcohol contained in the wax elaborated by acid-fast bacilli having therapeutic action upon the host containing acid-fast bacilli when administered parenterically.

10. A substance comprising an ester derivative of an alcohol contained in the wax elaborated by tubercle bacilli having therapeutic action upon the host containing acid-fast bacilli when administered parenterically.

11. A substance comprising an acetic ester of an alcohol contained in the wax elaborated by acid-fast bacilli having therapeutic action upon the host containing acid-fast bacilli when administered parenterically.

12. A substance comprising an acetic ester of an alcohol contained in the wax elaborated by tubercle bacilli having therapeutic action upon the host containing acid-fast bacilli when administered parenterically.

13. A substance comprising an ester derivative of a hydrocarbon contained in the wax elaborated by acid-fast bacilli having therapeutic action upon the host containing acid-fast bacilli when administered parenterically.

14. A substance comprising an ester derivative of a hydrocarbon contained in the wax elaborated by tubercle bacilli having therapeutic action upon the host containing acid-fast bacilli when administered parenterically.

15. A substance comprising a salicylic ester of a hydrocarbon contained in the wax elaborated by acid-fast bacilli having therapeutic action upon the host containing acid-fast bacilli when administered parenterically.

16. A substance comprising a salicylic ester of a hydrocarbon contained in the wax elaborated by tubercle bacilli having therapeutic action upon the host containing acid-fast bacilli when administered parenterically.

17. A substance comprising a derivative of a compound contained in the wax elaborated by not-highly-virulent acid-fast bacilli having therapeutic action upon the host containing acid-fast bacilli when administered parenterically.

18. A substance comprising a derivative of a compound contained in the wax elaborated by not-highly-virulent acid-fast bacilli capable of hypodermic injection without caseation.

19. A substance comprising an ester derivative of an alcohol and an ester derivative of a hydrocarbon contained in the wax elaborated by acid-fast bacilli having therapeutic action upon the host containing acid-fast bacilli when administered parenterically.

20. A substance comprising an ester derivative of an alcohol and an ester derivative of a hydrocarbon contained in the wax elaborated by tubercle bacilli having therapeutic action upon the host containing acid-fast bacilli when administered parenterically.

21. A substance comprising an ester derivative of an alcohol, an ester derivative of a hydrocarbon and an ester derivative of a fatty acid contained in the wax elaborated by acid-fast bacilli having therapeutic action upon the host containing acid-fast bacilli when administered parenterically.

22. A substance comprising an ester derivative of an alcohol, an ester derivative of a hydrocarbon and an ester derivative of a fatty acid contained in the wax elaborated by tubercle bacilli having therapeutic action upon the host containing acid-fast bacilli when administered parenterically.

23. A substance comprising an ester derivative of an unsaturated hydrocarbon contained in the wax elaborated by acid-fast bacilli having therapeutic action upon the host containing acid-fast bacilli when administered parenterically.

24. A substance comprising an ester derivative of an unsaturated hydrocarbon contained in the wax elaborated by tubercle bacilli having therapeutic action upon the host containing acid-fast bacilli when administered parenterically.

25. The process which comprises decomposing a compound contained in the wax elaborated by acid-fast bacilli and forming therefrom a derivative thereof containing only organic radicals.

26. The process which comprises saponifying a compound contained in the wax elaborated by acid-fast bacilli and esterifying the fatty acid thus obtained.

27. The process which comprises saponifying a compound contained in the wax elaborated by tubercle bacilli and esterifying the fatty acid thus obtained.

28. The process which comprises saponifying a compound contained in the wax elaborated by acid-fast bacilli, removing the alcohols, and esterifying the fatty acid thus obtained.

29. The process which comprises saponifying a compound contained in the wax elaborated by tubercle bacilli, removing the alcohols, and esterifying the fatty acid thus obtained.

30. The process which comprises saponifying a compound contained in the wax elaborated by acid-fast bacilli, removing the alcohols and hydrocarbons, and esterifying the fatty acid thus obtained.

31. The process which comprises saponifying a compound contained in the wax elaborated by tubercle bacilli, removing the alcohols and hydrocarbons, and esterifying the fatty acid thus obtained.

32. The process which comprises saponifying a compound contained in the wax elaborated by acid-fast bacilli, removing the alcohols and hydrocarbons, decanting and esterifying the fatty acid thus obtained.

33. The process which comprises saponifying a compound contained in the wax elaborated by tubercle bacilli, removing the alcohols and hydrocarbons, decanting and esterifying the fatty acid thus obtained.

34. The process which comprises saponifying a compound contained in the wax elaborated by acid-fast bacilli, removing an alcohol, esterifying the alcohol, and esterifying the fatty acid thus obtained.

35. The process which comprises saponifying a compound contained in the wax elaborated by tubercle bacilli, removing an alcohol, esterifying the alcohol, and esterifying the fatty acid thus obtained.

36. The process which comprises saponifying a compound contained in the wax elaborated by acid-fast bacilli, removing an alcohol, esterifying the alcohol, separating a hydrocarbon therefrom, and esterifying the fatty acid thus obtained.

37. The process which comprises saponifying a compound contained in the wax elaborated by tubercle bacilli, removing an alcohol, esterifying the alcohol, separating a hydrocarbon therefrom, and esterifying the fatty acid thus obtained.

38. The process which comprises saponifying a compound contained in the wax elaborated by acid-fast bacilli, removing an alcohol, esterifying the alcohol, separating a hydrocarbon therefrom, esterifying the hydrocarbon, and esterifying the fatty acid thus obtained.

39. The process which comprises saponifying a compound contained in the wax elaborated by tubercle bacilli, removing an alcohol, esterifying the alcohol, separating a hydrocarbon therefrom, esterifying the hydrocarbon, and esterifying the fatty acid thus obtained.

40. The process which comprises saponifying a compound contained in the wax elaborated by acid-fast bacilli, removing an alcohol, esterifying the alcohol, separating a hydrocarbon therefrom, esterifying the hydrocarbon to form a salicylate, and esterifying the fatty acid thus obtained.

41. The process which comprises saponifying a compound contained in the wax elaborated by tubercle bacilli, removing an alcohol, esterifying the alcohol, separating a hydrocarbon therefrom, esterifying the hydrocarbon to form a salicylate, and esterifying the fatty acid thus obtained.

42. The process which comprises saponifying a compound contained in the wax elaborated by acid-fast bacilli, removing an alcohol, and esterifying the alcohol.

43. The process which comprises saponifying a compound contained in the wax elaborated by tubercle bacilli, removing an alcohol, and esterifying the alcohol.

44. The process which comprises saponifying a compound contained in the wax elaborated by acid-fast bacilli, removing an alcohol, esterifying the alcohol, and separating a hydrocarbon therefrom.

45. The process which comprises saponifying a compound contained in the wax elaborated by tubercle bacilli, removing an alcohol, esterifying the alcohol, and separating a hydrocarbon therefrom.

46. The process which comprises saponifying a compound contained in the wax elaborated by acid-fast bacilli, removing an alcohol, esterifying the alcohol, separating a hydrocarbon therefrom, and esterifying the hydrocarbon.

47. The process which comprises saponifying a compound contained in the wax elaborated by tubercle bacilli, removing an alcohol, esterifying the alcohol, separating a hydrocarbon therefrom, and esterifying the hydrocarbon.

48. The process which comprises saponifying a compound contained in the wax elaborated by acid-fast bacilli, removing an alcohol, esterifying the alcohol, separating a hydrocarbon therefrom, and esterifying the hydrocarbon to form a salicylate.

49. The process which comprises saponifying a compound contained in the wax elaborated by tubercle bacilli, removing an alcohol, esterifying the alcohol, separating a hydrocarbon therefrom, and esterifying the hydrocarbon to form a salicylate.

50. The process which comprises saponifying a compound contained in the wax elaborated by acid-fast bacilli, removing an alcohol, esterifying the alcohol, separating a hydrocarbon therefrom, esterifying the hydrocarbon, esterifying the fatty acid thus obtained, and then adding together the various esters thus obtained.

51. The process which comprises saponifying a compound contained in the wax elaborated by tubercle bacilli, removing an alcohol, esterifying the alcohol, separating a hydrocarbon therefrom, esterifying the hydrocarbon, esterifying the fatty acid thus obtained, and then adding together the various esters thus obtained.

In testimony whereof I have signed this specification in the presence of two subscribing witnesses.

BENJAMIN S. PASCHALL.

Witnesses:
EDWARD L. OAKES,
I. R. SHANK.

Copies of this patent may be obtained for five cents each, by addressing the "Commissioner of Patents, Washington, D. C."

It is hereby certified that in Letters Patent No. 1,250,345, granted December 18, 1917, upon the application of Benjamin S. Paschall, of Seattle, Washington, for an improvement in "Substances for Treatment of Tuberculosis, Leprosy, and Other Diseases and Processes of Mixing Said Substances," an error appears in the printed specification requiring correction as follows: Page 8, line 24, claim 1, strike out the article "the"; and that the said Letters Patent should be read with this correction therein that the same may conform to the record of the case in the Patent Office.

Signed and sealed this 12th day of March, A. D., 1918.

[SEAL.]

R. F. WHITEHEAD,

*Acting Commissioner of Patents.*

Cl. 167—7.